(12) United States Patent
Petersson et al.

(10) Patent No.: US 8,807,983 B2
(45) Date of Patent: Aug. 19, 2014

(54) THERMOFORMING APPARATUS

(75) Inventors: Mikael Petersson, Linköping (SE); Per Hallander, Linköping (SE); Jan Andersson, Linköping (SE); Anders Westerdahl, Linköping (SE)

(73) Assignee: SAAB AB, Linköping (SE)

( * ) Notice: Subject to any disclaimer, the term of this patent is extended or adjusted under 35 U.S.C. 154(b) by 179 days.

(21) Appl. No.: 13/131,633

(22) PCT Filed: Nov. 28, 2008

(86) PCT No.: PCT/SE2008/051374
§ 371 (c)(1),
(2), (4) Date: Jun. 29, 2011

(87) PCT Pub. No.: WO2010/062234
PCT Pub. Date: Jun. 3, 2010

(65) Prior Publication Data
US 2011/0248431 A1    Oct. 13, 2011

(51) Int. Cl.
*B29C 70/44*    (2006.01)

(52) U.S. Cl.
USPC .................................................. 425/389

(58) Field of Classification Search
USPC .............. 425/384, 388, 389, 405.2, 504, 520, 425/508
See application file for complete search history.

(56) References Cited

U.S. PATENT DOCUMENTS

| 4,101,252 A * | 7/1978 | Brown .......................... 425/394 |
| 6,149,844 A * | 11/2000 | Graham ........................ 425/389 |
| 2001/0023005 A1 * | 9/2001 | Chapuis et al. ................. 428/53 |
| 2009/0309249 A1 * | 12/2009 | Inston .......................... 264/40.6 |

FOREIGN PATENT DOCUMENTS

| GB | 2 267 457 A | 12/1993 |
| WO | WO 96/07532 | 3/1996 |

OTHER PUBLICATIONS

International Search Report, dated Jun. 25, 2009, issued in connection with the International Patent Application No. PCT/SE2008/051374.
Written Opinion of the International Searching Authority, dated Jun. 25, 2009, issued in connection with the International Patent Application No. PCT/SE2008/051374.
International preliminary report on patentability, dated Dec. 22, 2010, issued in connection with the International Patent Application No. PCT/SE2008/051374.

* cited by examiner

*Primary Examiner* — Robert B Davis
(74) *Attorney, Agent, or Firm* — Venable LLP; Eric J. Franklin

(57) ABSTRACT

A thermoforming apparatus for forming a blank into a composite article. The thermoforming apparatus includes a forming tool. A forming member forms the blank over the forming tool. A first chamber is arranged for containing the blank. A second chamber is separated from the first chamber by the forming member. A first air circulator is configured to circulate air in the first chamber for achieving a heat distribution to the blank. The first air circulator includes a controllable valve member. The apparatus also includes a second air circulator. A method for forming a blank during circulation of air in a first chamber.

5 Claims, 2 Drawing Sheets

THERMOFORMING APPARATUS

CROSS-REFERENCE TO RELATED APPLICATIONS

This application is the national phase under 35 U.S.C. §371 of PCT/SE2008/051374 filed 28 Nov. 2008.

TECHNICAL FIELD

The present invention relates to a thermoforming apparatus and to a method.

The article to be formed can be made of a thermo setting plastic, such as resin composite, epoxy resins or of a thermoplastic, polyester resin, fibreglass or carbon fibre reinforced plastic etc.

The present invention relates generally to aircraft industry, but is not limited to that.

BACKGROUND ART

The production of composite articles requires the use of pressure onto the blank for forming the blank over the forming tool. The forming member, such as a vacuum bag, is used to achieve said pressure such that wrinkles and trapped air in the blank can be forced out under vacuum pressure. The blank can be made by a so called "prepreg" material (layers or plies of fibre material previously impregnated with resin, such as thermosetting resin). The thermoforming apparatus comprising the forming member can be used for curing the resin of the blank in an autoclave or in an oven at elevated temperature and pressure. After curing the forming member is removed from the forming tool and the article can be removed.

It is desirable that the heat distribution in the blank is uniform during the forming process so that the forming cycle will be as short as possible. Today the use of an air circulation means is common in ovens or in autoclaves, but the lack of uniform heat distribution to the blank still exists.

One way of distributing heat in an apparatus is disclosed in WO 96/07532, wherein fluid is circulated in cavities under pressure for elevating the temperature of the composite lay-up.

However, there is a need for an improvement of apparatuses such as autoclaves, ovens or other thermoforming apparatuses using hot air for forming and curing the blank.

The object of the present invention is to overcome above-mentioned drawbacks and to develop known thermoforming apparatuses.

SUMMARY OF THE INVENTION

This has been solved by a thermoforming apparatus being initially defined in the introduction.

In such way a uniform heat distribution is provided around the blank placed in the first chamber delimited by the forming member. Also the side of the blank facing the forming tool will have a uniform heat distribution, which is advantageously when forming a blank which is rather thick. Preferably, the first air circulation means comprises a fan installation.

Suitably, the second chamber comprises a second air circulation means.

In such way the air can be circulated for a uniform heat distribution also to the surface of the blank facing away from the forming tool.

Preferably, the first air circulation means is in communication with a heating device.

Thereby a heating of the blank is achieved reducing the cycle of forming and curing the blank onto the forming tool. Advantageously, the heating device is located in the second chamber for heating the blank, i.e. on the side facing away from the forming tool.

Alternatively, the first and the second air circulation means are in communication with each other.

Thereby the same temperature can be achieved for both the first chamber and the second chamber which is beneficial for the heat distribution to the blank. In this way an oven, already being equipped with a heating device and having an air circulation means, can be connected to the first chamber of the thermoforming apparatus.

Preferably, at least one channel is provided in the forming tool for heating the forming tool uniformly.

In such way the blank's surface, being in contact with the forming tool, can obtain a heat distribution. The heated air is conducted through the forming tool for heating the blank's side faced towards the forming tool, wherein the forming tool will have the same temperature as prevails in the first chamber.

Suitably, the first air circulation means comprises a controllable valve member.

Thereby the air circulation in the first chamber can be controlled dependent upon the properties of the blank to be formed and cured.

Alternatively, the forming member is a vacuum bag.

In such way the thermoforming apparatus can be used within and connected to a conventional autoclave or oven for achieving a uniform heat distribution to the blank. When using the vacuum bag as a forming member, the first chamber's volume will be reduced to a minimum when the blank has been fully formed over the forming tool. The hot air circulation is closed off by means of the valve member before the forming procedure starts.

This has also been solved by a method being initially defined in the introduction.

In this way a method is provided for forming a blank using a forming member and vacuum, which method can be used together with already existing ovens and/or autoclaves in a production line.

Preferably, the circulated air is heated by means of a heating device.

Suitably, the air being circulated also is circulated in the second chamber.

BRIEF DESCRIPTION OF THE DRAWINGS

The present invention will now be described by way of examples with reference to the accompanying schematic drawings, of which schematically in cross-section.

DETAILED DESCRIPTION

Hereinafter, embodiments of the present invention will be described in detail with reference to the accompanying drawings, wherein for sake of clarity and understanding of the invention some details of no importance are deleted from the drawings.

Figure 1A:
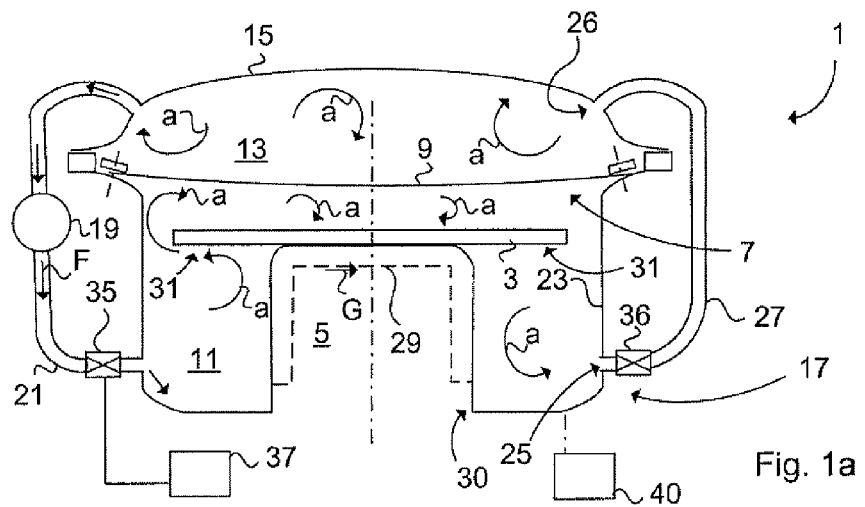
FIG. 1a illustrates a thermoforming apparatus according to a first embodiment in an initial state of forming a blank.

FIG. 1a schematically illustrates a thermoforming apparatus 1 according to a first embodiment. The thermoforming apparatus 1 is arranged for forming a blank 3 into a composite article and comprises an elongated forming tool 5 for forming the composite article (such as a beam), a forming member 7 for forming the blank 3 over the forming tool 5. The forming member 7, here an elastic vacuum bag 9, separates a first chamber 11, arranged for containing the blank 3, from a second chamber 13. The volumes of the first 11 and second 13 chamber are variable depending on the state of forming the blank 3 onto the forming tool 5 and the location of the forming member 7. The blank 3 is applied onto the forming tool 5 and being enclosed by the vacuum bag 9. The thermoforming apparatus 1 comprises a cover 15 which is removable fastened air tight to a forming tool fundament 17. An air pump 19 is arranged to an isolated first air pipe 21, which is connecting the second chamber 13 with the first chamber 11. The air pump 19 is arranged for conducting an air flow from the second chamber 13 to the first chamber 11 and vice versa. The opposite wall 23 of the forming tool fundament 17 (opposite the wall containing the first air pipe 21 seen in a direction crosswise the elongated forming tool 5) comprises an orifice 25 of an isolated second air pipe 27 being coupled to the cover 15. An orifice 26 of the second air pipe 27 in the cover 15 is arranged opposite to an orifice in the cover 15 of the first air pipe 21. Firstly, during use of the thermoforming apparatus 1, the air pump 19 creates an air flow F in the first air pipe 21, wherein the conducted air is circulated in the first chamber 11. Circulating air a will flow over the blank's 3 upper side (i.e. between the vacuum bag 9 and the blank 3) and further to the other side (marked with 30) of the forming tool 5. Heated air (marked with G) will flow through the forming tool 5 for heating the blank's 3 under side. The blank 3 is in this state essential flat (by it self or by means of a support, not shown), wherein the circulating air a also will flow against the free underside 31 of the blank 3. The first chamber 11 thus comprises a first air circulation means (the pump 19 and the first 21 and second 27 air pipes) for circulating air in the first chamber 11 for achieving a heat distribution to the blank 3. In this embodiment the temperature corresponds to room temperature (here 20° C.) and no heating device is necessary. The primary task is to circulate the 20° C. tempered air in the first chamber 11 such that the blank 3 is in contact with the circulated air a and will have a uniform heat distribution. By means of the second air pipe 27, the air will flow from the first chamber 11 to the second chamber 13. The orifice 26 of the second air pipe 27 is arranged (and being formed as a diffuser, not shown) in the cover 15 such that the air in the second chamber 13 will be circulated also here for achieving a uniform heat distribution (here 20° C.) over the vacuum bag 9. The 20° C. tempered air will thus be transferred to the blank 3 via the vacuum bag material of the vacuum bag 9 (see FIG. 1b), the temperature of which also will have a temperature of 20° C. by means of the circulated air a in the second chamber 13.

Valves 35 and 36 are arranged in the first air pipe 21 near the first chamber 11 and in the second air pipe 27 respectively. The valves 35, 36 are controllable by means of a control unit 37. The valves 35, 36 are closed before vacuum is applied to the first chamber 11 by means of a vacuum source 40 evacuating the vacuum bag 9 for forming the blank 3 over the forming tool 5.

Figure 1B:
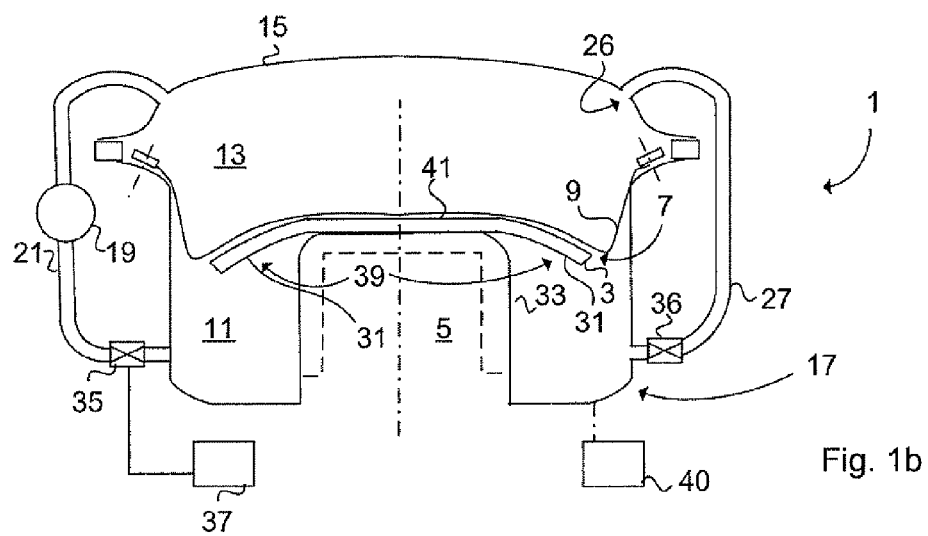
FIG. 1b illustrates the thermoforming apparatus in FIG. 1a starting to form the blank over a forming tool.

FIG. 1b further illustrates the thermoforming apparatus 1 in FIG. 1a initially forming the blank 3 over a forming tool 5.

The tempered air has affected the blank 3 such that it has a uniform temperature (see FIG. 1a). The valves 35 and 36 are closed for not conducting vacuum to the second chamber 13 and the air circulation system. The vacuum bag 9 is evacuated by creating a vacuum in the first chamber 11 via a vacuum line and the vacuum source 40 connected to the first chamber 11. Thereby the vacuum bag 9 will exert forces onto the blank 3 for forming it over the forming tool 5. A uniform heat distribution prevails and all sides of the blank 3 will have a uniform temperature, and the entire blank 3 will thus have an even temperature, which is advantageously when forming a blank 3 which is rather thick. The underside 31 of the blank 3, faced towards the forming tool 5 can thereby have a uniform temperature, since extending parts 39 of the blank 3 have been exposed to the circulated air a in the first chamber 11 (see FIG. 1a). The channel 29 of the forming tool 5 provides that also the part of the blank 3 facing the forming tool 5 will have that uniform temperature by means of said air flow G conducted in FIG. 1a. The upper side 41 of the blank 3 faced away from the forming tool 5 is in contact with the vacuum bag 9, which transfers a uniform heat distribution from the second chamber 13, wherein the upper side 41 also will have that uniform temperature.

Figure 1C:
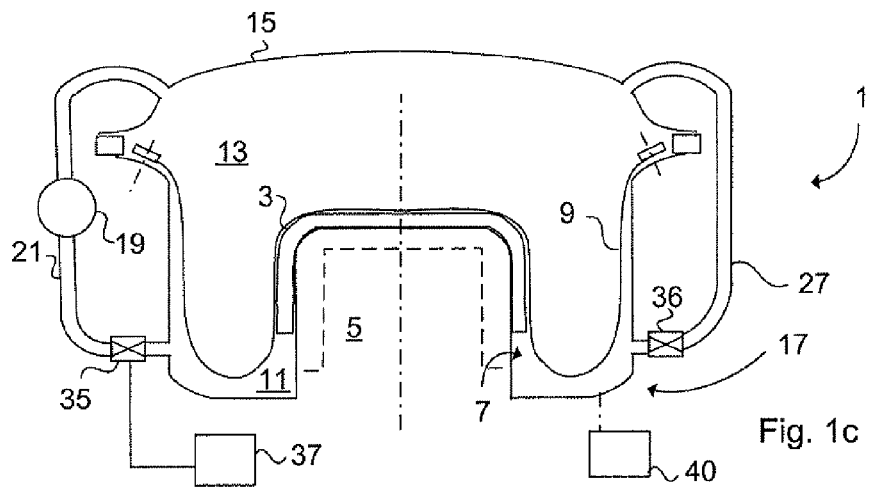
FIG. 1c illustrates the thermoforming apparatus in FIG. 1a in a final state of forming the blank.

FIG. 1c illustrates the thermoforming apparatus 1 in FIG. 1a in a final state of forming the blank 3. The blank 3 is now almost formed over the forming tool 5 by means of the vacuum bag 9. It is now possibly to further heat the blank by means of further heating means (not shown) into a cured state and a finished article. A valve controlled by-pass line (not shown) is connected to the second chamber 13 for heating the formed blank 3.

Figure 2:
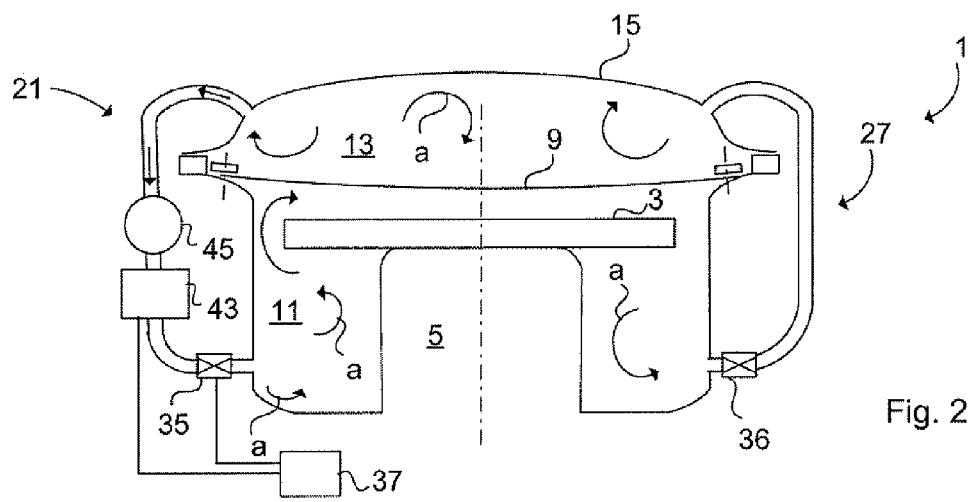
FIG. 2 illustrates a thermoforming apparatus according to a second embodiment having an additional heating device.

FIG. 2 illustrates schematically a thermoforming apparatus 1 according to a second embodiment having an additional heating device 43 connected to the first air pipe 21. By means of the control unit 37, the heating device 43, here a heating conductor, is controlled to produce a uniform heat to the circulated air a by heating the air flow in the first air pipe 21. The blank 3 is a rather thick lay-up of prepreg material, the thickness of which is 10-80 mm. preferably 35-55 mm.

A fan 45 is installed in the first air pipe 21 for producing the circulation of air in the first 11 and second 13 chamber. The blank 3 will have a uniform raised temperature in the initial state of forming by means of the circulated heated air in the fist chamber 11, which comprises the forming tool 5 supporting the blank 3. The first 21 and second 27 air pipes constitute in co-operation with the fan 45, a first air circulation means as well as a second air circulation means for the first 11 respective second 13 chamber. The first and the second air circulation means (first 21 and second 27 air pipe) are in communication with each other and constitute a common circulation means. Thereafter the valves 35, 36 are closed and the forming of the blank 3 starts. After completed forming, the formed blank 3 is cooled (i.e. a pre-formed blank is achieved).

Figure 3:
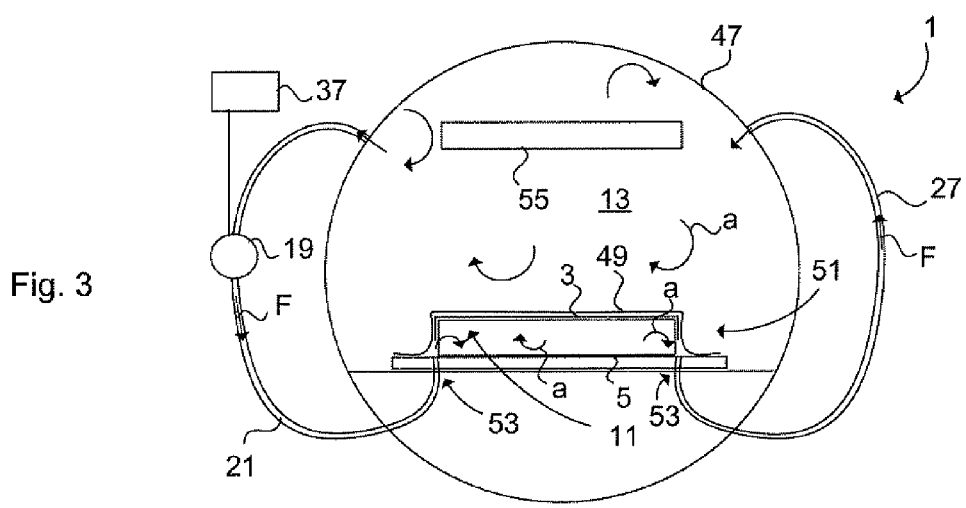
FIG. 3 illustrates a thermoforming apparatus adapted for an autoclave.

FIG. 3 illustrates schematically a thermoforming apparatus 1 adapted for an autoclave 47. A blank 3 has been formed by a vacuum sheet 49 over a forming tool 5, all parts of which constituting a forming unit 51. The forming unit 51 has connection points 53 leading to a first chamber 11 of the forming unit 51 (i.e. under the vacuum sheet 49). The forming unit 51 is placed in an autoclave 47 and is connected via the connection points 53 (including valves for closing off circulated air before the forming procedure starts) to a first 21 and second 27 air pipe leading to the interior (constituting a second chamber 13) of the autoclave 47. A heating element 55 is arranged in the second chamber 13. An air pump 19 of the first air pipe 21 is controlled to create an air flow F for circulation of air a in the first chamber 11 and, via the second air pipe 27, a circulation of air a in the second chamber 13. Thereby the same temperature can be achieved for the air in both the first chamber 11 and the second chamber 13, which is beneficial for the heat distribution to the blank 3. In this way the autoclave 47 already being equipped with the heating element 55 can be used for providing the desirable function of the thermoforming apparatus 1. The first and second air circulation means (the first 21 and second 27 air pipe and air pump 19) can easily be connected to the first chamber 11 of the forming unit 51 and to the autoclave 47.

In FIGS. 1-3 the respective orifice of the air pipes in the wall of the first chamber is sealable by a controllable shutter providing an even surface of the first chamber's interior wall when the forming procedure starts for not damaging the forming member 7.

Figure 4:
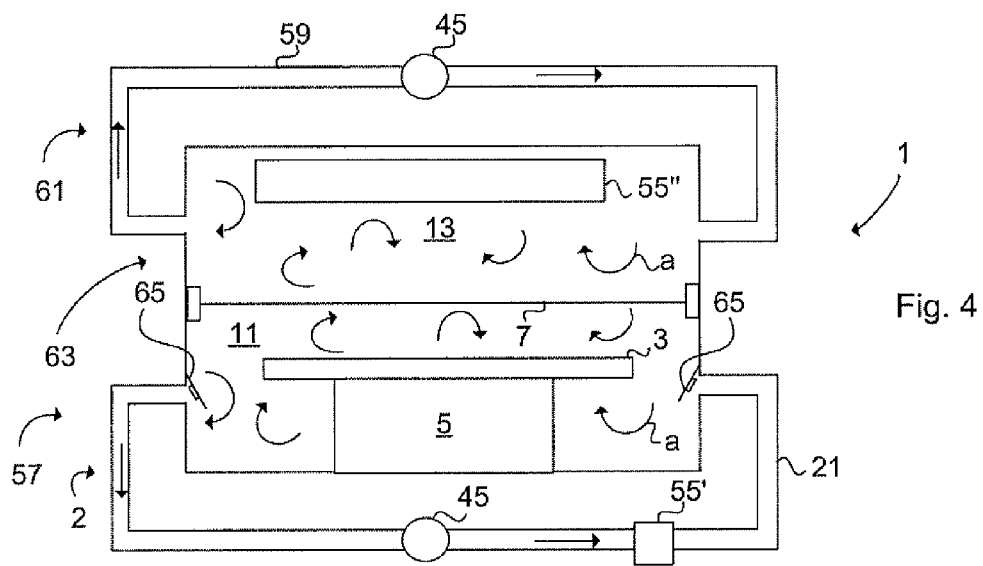
FIG. 4 illustrates a thermoforming apparatus having two separate air circulation systems.

FIG. 4 illustrates a thermoforming apparatus 1 having two separate air circulation systems 57, 59. The forming tool 5 arranged in the first chamber 11 supports the blank 3. A first air circulation means 2, comprising a fan 45, a first heating element 55', a first air pipe 21, is provided for circulating heated air a around the blank 3. A separate second air circulation means 61, comprising a second air pipe 59 and an additional fan 45, is provided for circulation of air in the second chamber 13 already comprising a second heating element 55", being a part of an oven. When the forming member 7 has formed the blank 3 over the forming tool 5 and the blank 3 is cured, the forming member 7 is released and the blank 3, now constituting an article, is removed from the forming tool 5. Flap valves 65 are biased in an open state, for the outlet of the conducted air. The valves 65 are closed mechanically by means of electrical relays (not shown) before the forming procedure starts.

The present invention is of course not in any way restricted to the preferred embodiments described above, but many possibilities to modifications, or combinations of the described embodiments thereof, should be apparent to a person with ordinary skill in the art without departing from the basic idea of the invention as defined in the appended claims. The surface of the forming tool can be concave, convex or be of other shapes and the article to be formed can be a beam, a panel, a bulkhead etc. in aircraft industry. Of course the formed blank can be removed from the forming tool before curing the blank. The curing can be performed later together with another article.

The invention claimed is:

1. A thermoforming apparatus for forming a blank into a composite article, the thermoforming apparatus comprising:
   a forming tool,
   a forming member for forming the blank over the forming tool,
   a first chamber, arranged for containing the blank and the forming tool,
   a second chamber, wherein the forming member separates the first chamber from the second chamber,
   a first air circulator configured to circulate air in said first chamber for achieving a heat distribution to the blank, wherein the first air circulator comprises a controllable valve member configured to control air flow to and from the first chamber, and
   a second air circulator configured to circulate air in said second chamber.

2. The thermoforming apparatus according to claim 1, further comprising:
   a heater operatively connected to the first air circulator.

3. The thermoforming apparatus according to claim 1, wherein the first air circulator and the second air circulator are in communication with each other.

4. The thermoforming apparatus according to claim 1, wherein the forming member is a vacuum bag.

5. The thermoforming apparatus according to claim 1, further comprising:
   a vacuum source configured to apply a vacuum to the first chamber.

* * * * *